April 29, 1941.	L. H. GILES	2,240,095
ROCK DRILL BIT CONE CATCHER
Original Filed Aug. 25, 1938
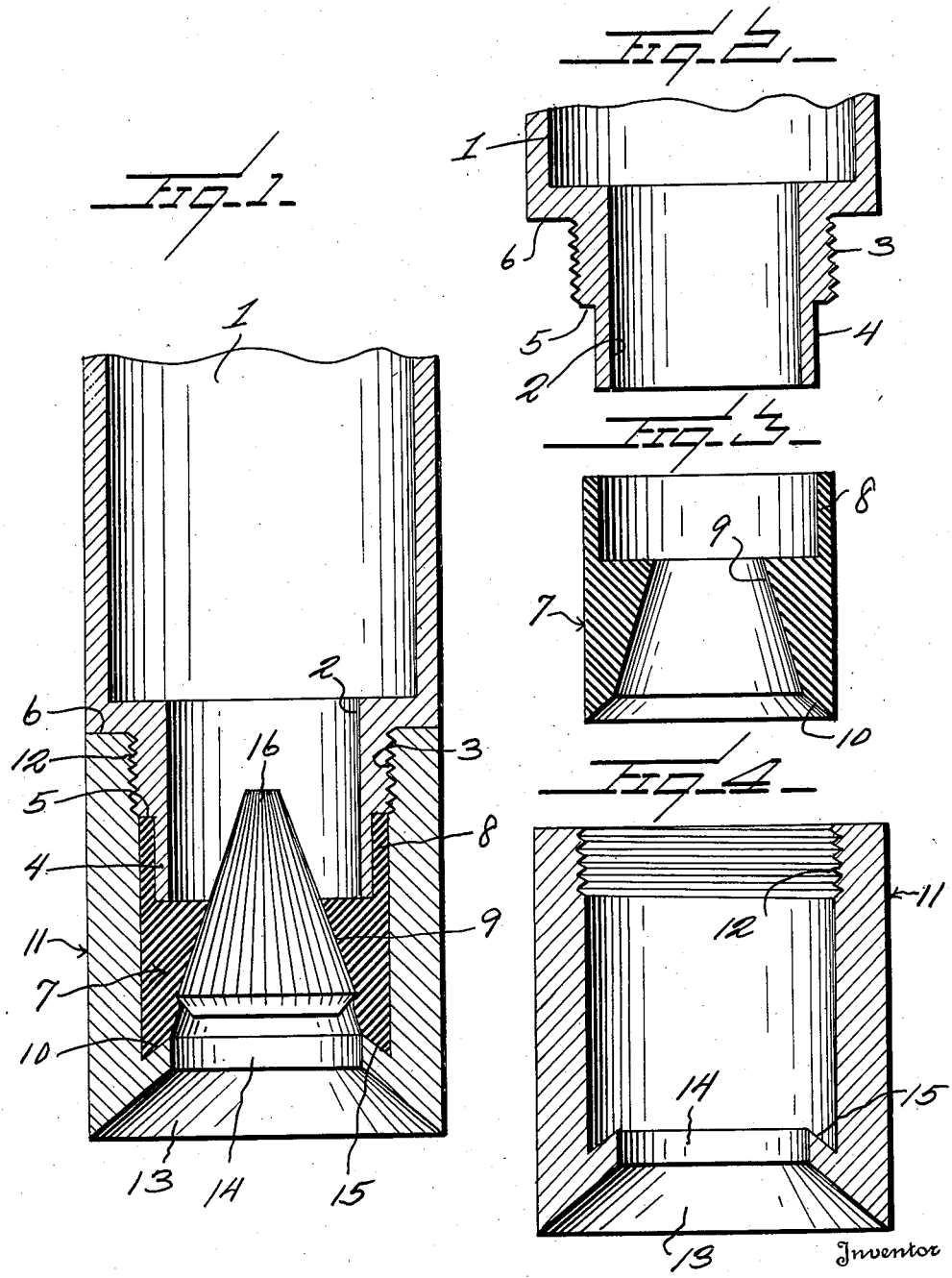
Inventor
L. H. Giles
By Watson E. Coleman
Attorney Patented Apr. 29, 1941

2,240,095

UNITED STATES PATENT OFFICE 2,240,095

ROCK DRILL BIT CONE CATCHER

Leonard H. Giles, Odessa, Tex., assignor of forty per cent to Darell C. Sears, Hobbs, N. Mex.

Application August 25, 1938, Serial No. 226,821
Renewed August 1, 1940

6 Claims. (Cl. 294—99)

This invention relates to well drilling apparatus and pertains particularly to improvements in fishing tools.

The present invention has for its primary object to provide an improved fishing tool designed for catching broken rock bit cones, by the use of a rubber unit into which the rock bit cone is forced and by which it is held so that it may be removed from a well hole.

Another object of the invention is to provide a fishing tool designed particularly for catching broken rock drill bits, which has as the essential feature thereof an upwardly tapering rubber sleeve carried upon the lower end of a stem and adapted to have the broken rock bit cone forced thereinto so that it, the sleeve, will resiliently engage and hold the cone so that it may be removed from the well hole.

A further object of the invention is to provide a novel fishing tool of the character described, comprising a stem portion, a rubber sleeve adapted to be attached to the lower end of the stem in coaxial relation therewith and having an upwardly tapering central passage, and a retaining collar for the sleeve which engages the lower edge of the latter and is threadably attached to the stem to maintain the cone catching sleeve in operative position.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in longitudinal section of the lower part of the fishing tool embodying the present invention, showing a drill bit cone secured therein.

Fig. 2 is a sectional view of the lower end of the stem.

Fig. 3 is a sectional view of the cone engaging or gripping sleeve.

Fig. 4 is a sectional view through the sleeve retaining collar.

Referring now more particularly to the drawing, the numeral 1 represents the lower end portion of a tubular stem forming a part of the present fishing tool. This stem is of reduced overall diameter as indicated at 2, and this reduced portion is exteriorly threaded through substantially half its length, starting at the center and extending away from the end thereof, as indicated at 3, while the remaining outer half is smooth, as indicated at 4. The part of the reduced portion 2 in which the screw threads 3 are cut is somewhat thicker than the part circumscribed by the smooth face 4, thus forming a shoulder 5 at the inner end of the surface 4 and at the inner end of the threaded portion, a shoulder 6 is formed which constitutes the lower end of the unreduced part of the stem.

The numeral 7 generally designates a rubber sleeve which has a portion of one end of constant thickness providing the flange portion 8 which has an interior diameter substantially equal to the exterior diameter of the portion 4 of the stem over which this flange is adapted to be extended, as shown in Fig. 1, and the outside or overall diameter of the sleeve 7 is substantially equal to the diameter of the threaded portion from the valleys of the threads on one side to the valleys of the threads on the other side. Thus it will be seen that when the sleeve 7 is mounted upon the smooth portion 4 of the reduced end of the stem as shown in Fig. 1, no part of its outer surface will extend beyond the valleys between the screw threads.

The major portion of the length of the sleeve 7 is relatively thick and has the tapered passage 9 formed therethrough, the taper of the passage leading toward the end of the sleeve from which flange 8 projects. The outer or wide end of the tapered passage 9 is flared laterally to form the shoulder 10.

The numeral 11 generally designates a collar by which the sleeve 7 is retained in position upon the stem. This collar comprises a cylindrical body having an overall diameter equal to that of the stem 1 and having through the major part of its length an interior diameter equal to the overall diameter of the sleeve 7. At one end the collar 11 is interiorly threaded as indicated at 12, for engagement with the threads 3 and at the opposite end there is formed the inwardly sloping shoulder or guide face 13 which extends into the inwardly directed lip 14, the angle of the inner side 15 of the lip with respect to the inner wall face of the collar being the same as the angle between the shoulder 10 of the sleeve and the outer face thereof, so that when the sleeve 7 has been placed in position with the flange portion 8 extended over the exteriorly smooth part 4 of the stem with the inner end of the flange 8 abutting the shoulder 5, the collar 11 can be slipped over the sleeve 7 and threadably engage with the threads 3 to bring the upper end of the collar against the shoulder 6. When this assembly is made, the sleeve 7 will position snugly within the collar 11 and the tapered or flared shoulder portion 10 will seat against the inclined inner face 15 of the lip 14 so that the resilient sleeve will be maintained in a position between the collar and stem in which it is shown in Fig. 1.

In use, the stem is extended into the well hole to fish for a broken rock bit cone and the cone is secured by being forced into the tapered passage 9 of the resilient sleeve 7. The sleeve will naturally yield when the lower end of the fishing tool is forced over the bit cone so that it will exert a gripping action on the cone and the latter may be withdrawn from the well hole with the fishing tool. Fig. 1 illustrates how a cone might be gripped in the passage of the resilient sleeve 7, the cone being designated by the numeral 16.

It will, of course, be understood that the stem will be mounted upon or attached to the lower end of the drill pipe after removing the drill bit from which the cone has been lost. The drill pipe after being reinserted into the well hole with the cone catcher will be rotated while lowering the catcher so that when the cone is located, the rotating action of the catcher will effect the working of the cone into and through the rubber body. Since it is possible for the cone to pass completely through the rubber body, it will be apparent that more than one cone can be picked up and removed from the well. During the fishing operation, the circulation of fluid through the drill pipe and the catcher can be maintained but this circulation will be stopped after the cone has been caught and before the catcher is started out of the well.

It is believed to be entirely new in the art to which the present invention pertains, to employ a rubber conical sleeve within a tubular carrier body for the purpose of catching or fishing out of oil wells or other types of wells, bit cones or other lost or broken implements. With the present device, the cone or other lost implement or body which it is desired to remove from the well is easily forced into the lower end of the tubular carrier past the rubber sleeve or cone 7. Because of the use of a rubber cone or sleeve, it is possible to pick up and lift out of the well, cones of different sizes without having to change the sleeve to accommodate the particular size cone or other tool which is to be fished out of the hole.

What is claimed is:

1. A rock drill bit cone fishing tool, comprising a stem having an exteriorly reduced lower open end, a collar detachably secured to the said reduced open end and having the same outside diameter as the stem, and a sleeve of resilient material secured by the collar to and in coaxial relation with the open end of the stem, the sleeve having an inwardly tapering passage therethrough.

2. A fishing tool of the character described, comprising a stem open at one end and having the said open end of reduced diameter, a sleeve of resilient material having a longitudinally extending end flange portion adapted to extend partway over the reduced part of the stem, said sleeve having a central passage therethrough tapering in the direction of the adjacent end of the stem, a collar encircling said sleeve and coupled with the reduced portion of the stem beyond the sleeve flange, and means carried by the collar for engaging the outer end of the sleeve.

3. A fishing tool, comprising a tubular stem having a reduced end portion, a part of the outer end of the reduced portion being of smooth exterior formation and the remaining part of the reduced portion having screw threads in the outer side thereof, a rubber sleeve having a longitudinally extending end flange portion designed to slip over the smooth outer portion of the reduced end of the stem, said sleeve having a passage centrally therethrough and tapering toward the flanged end thereof, a collar adapted to enclose said sleeve and having interior screw threads at one end for engagement with the threads upon the reduced end of the stem, and an inwardly extending annular lip at the opposite end of said collar engaging over the adjacent end of the sleeve.

4. A fishing tool, comprising a tubular stem having a reduced end portion, a part of the outer end of the reduced portion being of smooth exterior formation and the remaining part of the reduced portion having screw threads in the outer side thereof, a rubber sleeve having a longitudinally extending end flange portion designed to slip over the smooth outer portion of the reduced end of the stem, said sleeve having a passage centrally therethrough and tapering toward the flanged end thereof, a collar adapted to enclose said sleeve and having interior screw threads at one end for engagement with the threads upon the reduced end of the stem, an inwardly extending annular lip at the opposite end of said collar engaging over the adjacent end of the sleeve, the said adjacent end of the rubber sleeve being formed to provide an outwardly flaring shoulder, and said lip extending upwardly and inwardly from the adjacent end of the collar of which it forms a part and conforming with the inclination of and engaging against the shoulder of the sleeve.

5. A fishing tool for well holes, comprising a cylindrical body open at one end and designed to be inserted into the well hole with the open end directed downwardly, a rubber sleeve secured exteriorly throughout its length within and coaxially with the body inwardly of the said open end thereof, said sleeve being tapered interiorly only and away from the open end of the body and having sufficient resiliency to be compressed by and facilitate the passage of a tool through the tapered end thereof and into the body.

6. A fishing tool for well holes, comprising a cylindrical body open at one end and designed to be inserted into the well hole with the open end directed downwardly, a rubber sleeve secured within and coaxially with the body inwardly of the said open end thereof, said sleeve being interiorly tapered away from the open end of the body and having a resiliency to facilitate the passage of a tool through the tapered end thereof and into the body, said end of the body carrying the rubber sleeve being provided with an inwardly tapering shoulder designed to direct the tool into the central portion of the rubber sleeve, the inner edge of the shoulder forming a guard and a supporting seat for the outer end of the sleeve.

LEONARD H. GILES.